July 1, 1930.   J. T. DOOLAN   1,768,581
CULTIVATOR AND PULVERIZER
Filed July 7, 1928
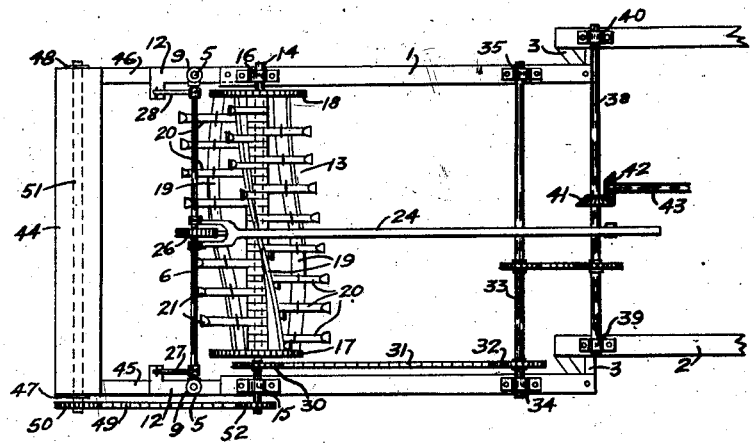
Fig. 1.
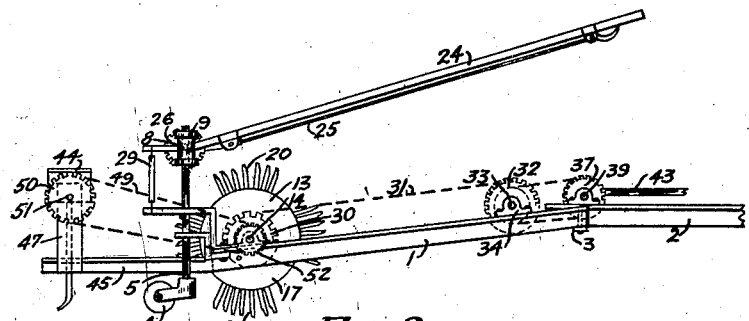
Fig. 2.
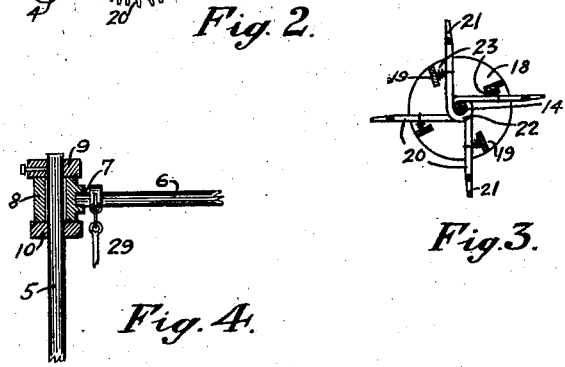
Fig. 3.
Fig. 4.
Inventor
J. T. Doolan
By E. J. Featherstonhaugh
Atty.

Patented July 1, 1930

1,768,581

UNITED STATES PATENT OFFICE

JOHN THOMAS DOOLAN, OF EDMONTON, ALBERTA, CANADA

CULTIVATOR AND PULVERIZER

Application filed July 7, 1928. Serial No. 290,978.

My invention relates to improvements in cultivators and pulverizers, and has for its object the breaking and cultivating of land, embracing in one operation plowing, discing, harrowing and seeding. It consists of a rotary spiral having teeth attached thereto, and in such formation, that in the operation of the machine, they break the ground, lifting the earth into the air and causing a separation of all noxious weeds, and the earth being heavier, falls back first, leaving the weeds lying loosely on top, where, if necessary, they can be disposed of. The rotary spiral is geared to such a pitch that the number of revolutions increases in proportion to the increased speed of the driving power.

I attain these objects more particularly by means of the mechanism illustrated in the accompanying drawings, in which:—

Fig. 1 is a plan view of the machine.

Fig. 2 is a side elevation.

Fig. 3 is a detail cross-section view of the rotary spiral with arrangement of the teeth.

Fig. 4 is a detail of the connection of the supporting bar to the spindles of the rear wheels of the machine.

Similar figures refer to similar parts throughout the various views.

1 is the main frame of the cultivator which is attached to frame 2 of a tractor or other driving power, by means of brackets 3. The rear end of the frame 1 is supported by castor wheels 4 attached to spindles 5. The spindles 5 are supported by a cross bar 6 which is attached loosely in sockets 7 forming part of the sleeves 8 the said sleeves being held loosely at top ends of spindles 5 between two collars 9 and 10. These collars are firmly attached to the tops of the spindles 5. The spindles 5 are held in place loosely and guided by the two bracket arms 11 and 12 which are attached to the main frame 1.

A rotary spiral 13 with a centre shaft 14 is journalled in bearings 15 and 16 attached on either side of main frame 1. The rotary spiral consists of two circular ends 17 and 18, and having spaced in between them, spiral slats 19 to which are attached teeth 20. The teeth are formed of square steel bars having their outer ends 21 flattened out fan-shaped, while the inner ends 22 are curved around and loosely held on crossbar 6. The teeth are attached to the spiral slats 19 by means of springs 23. These springs are rigid enough to keep the teeth in place when plowing into ordinary ground, but allow of a certain movement backwards when the teeth come in contact with rocks or other hard substances which they are unable to lift, and immediately spring back to their normal position after the obstacle is passed. The teeth fit loosely around the cross-bar 6 and a broken or damaged tooth can be removed and replaced at any time.

A lifting device is supplied for raising the rotary spiral when not in operation by means of lever 24, having a ratchet arrangement 25 which engages with the ratchet 26 attached firmly to cross-bar 6. On either side of the cross bar 6 are short arms 27 and 28 which are firmly attached to same, and a link connection 29 between these arms and the bracket arms 12, causes the rotary spiral to be lifted clear of the ground by the movement of the lever 24 which operates on the ratchet 26, causing the arms 27 and 28 to be tilted upwards, thus raising the end of the frame 1 to which the rotary spiral is attached.

The rotary spiral 13 is driven by a sprocket gear 30 attached to the cross shaft 14 and is connected by a chain drive 31 to sprocket gear 32 which is attached to counter shaft 33, said shaft being journalled in bearings 34 and 35 attached to main frame 1. The counter shaft 33 is driven by a chain drive 36 engaging with sprocket gear 37 attached to counter shaft 38 which is journalled in bearings 39 and 40 attached to main frame 2 of driving power. The counter shaft 38 is driven by bevel gears 41 and 42, the gear 42 being attached to the end of shaft 43 which is connected to the main drive of the tractor or other power device.

The teeth 20 are so arranged on the spiral slats 19, so that no two teeth strike the ground at the same time, thereby eliminating a certain amount of drag and reducing the power required for the operation of the machine. On account of being fan-shaped, the teeth overlap each other on the various rows, thus ensuring that every part of the ground is broken.

A seed drill 44 is attached to the rear of the main frame 1 by means of arms 45 and 46 and supported on the standards 47 and 48. It is operated by means of a chain drive 49 engaging with sprocket gear 50 attached to shaft 51 of the seed drill 44 and sprocket gear 52 attached to the shaft 14 of the rotary spiral.

One or more of the cultivators can be attached to any power device, as required.

What I claim as my invention is:—

In cultivators and pulverizers, a cultivator member comprising a shaft having journal ends, discs fixedly mounted on said shaft and suitably spaced, teeth loosely mounted on said shaft between said discs and spiral strips fixedly secured to said discs and resiliently attached to said teeth.

JOHN THOMAS DOOLAN.